Oct. 7, 1941.  F. G. MARBACH  2,258,459

HUB AND WHEEL STRUCTURE FOR FANS OR BLOWERS

Filed March 7, 1941

INVENTOR.
FRANK G. MARBACH
BY
Kwis Hudson & Kent
ATTORNEYS

Patented Oct. 7, 1941

2,258,459

UNITED STATES PATENT OFFICE 2,258,459

HUB AND WHEEL STRUCTURE FOR FANS OR BLOWERS

Frank G. Marbach, Cleveland, Ohio, assignor to Morrison Products, Inc., Cleveland, Ohio, a corporation of Ohio Application March 7, 1941, Serial No. 382,222

7 Claims. (Cl. 230—132)

This invention relates to a hub and wheel structure and, as its principal object, aims to provide an improved structure of this kind which can be rapidly and economically manufactured and which can be embodied in centrifugal blowers or applied to various other uses.

This application is a division of my original application, Serial No. 258,009, filed February 23, 1939, now Patent No. 2,242,586 granted May 20, 1941.

Another object of my invention is to provide an improved hub and wheel structure which can be formed entirely of sheet metal by appropriate stamping or forming operations, thus eliminating the need for the more expensive machined parts usually employed in such structures heretofore.

A further object of my invention is to provide an improved structure, of the character mentioned, in which the hub is formed by connected sheet metal disk portions or members at least one of which constitutes an integral part of the sheet metal body forming the rim of the structure.

A further object of my invention is to provide a novel hub made up of connected sheet metal disk members and in which portions of said disk members define a threaded opening for a set screw or the like.

Other objects and advantages of my invention will be apparent from the following description when taken in conjunction with the accompanying sheet of drawings, in which.

Further reference will now be made to the accompanying drawing for the purpose of describing my improved hub and wheel structure in greater detail. Although my hub and wheel structure is hereinafter described in connection with a blower, it will be understood, of course, that the invention is not limited to this particular use nor to the particular details and arrangements shown in this instance.

Figure 1:
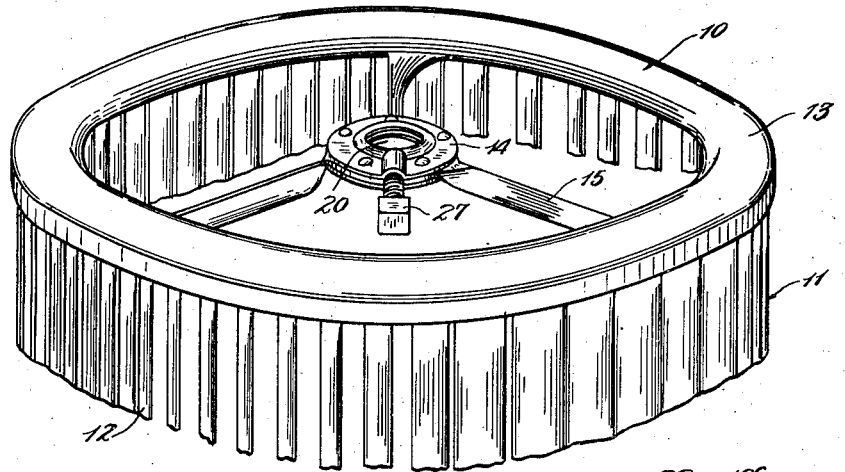
Fig. 1 is a partial perspective view showing my hub and wheel structure embodied in a centrifugal blower.
Figure 4:
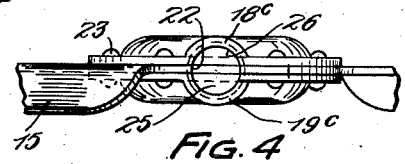
Fig. 4 is a partial edge view of the hub portion of the structure.

In Fig. 1 of the drawing I show my hub and wheel structure 10 embodied in a centrifugal blower 11 in which such structures form a support or mount for the blades 12 and also provide spiders for connecting the blower with a drive shaft. The blades 12 may comprise an annular series of transversely curved sheet metal blades which have their ends connected with the structures 10 and are held by the latter in the desired cylindrical arrangement. Although Fig. 1 shows only one such hub and wheel structure it will be understood that these structures may be employed at both ends of the blowers as in my original application.

The hub and wheel structure or spider 10 comprises a rim portion 13, a hub 14 and a plurality of radially extending arms 15 connecting the hub with the rim portion. As shown in the drawing, the rim portion 13 may be hollow or channel-shaped to receive the ends of the blades 12 therein. The arms or spokes 15 may be bevelled or deflected so as to resemble radially extending blades which facilitate movement of air axially into the interior of the blower during rotation thereof.

Figure 2:
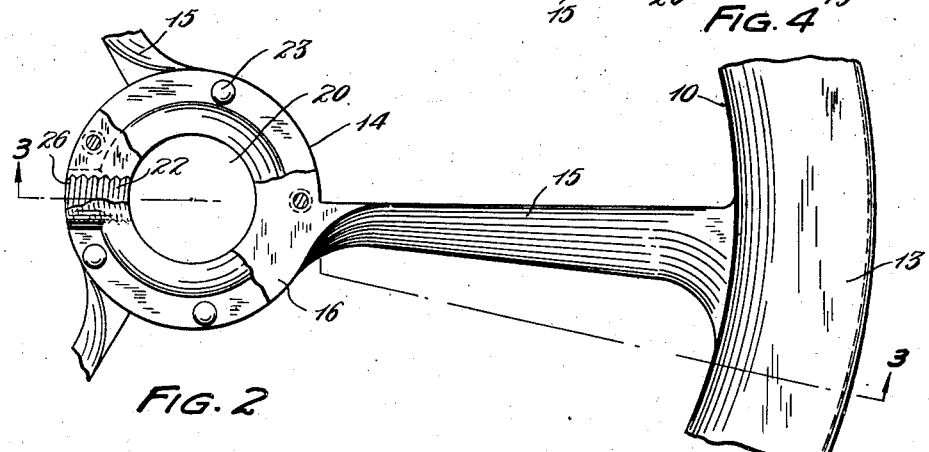
Fig. 2 is a plan view showing such hub and wheel structure, with portions thereof broken away.
Figure 3:
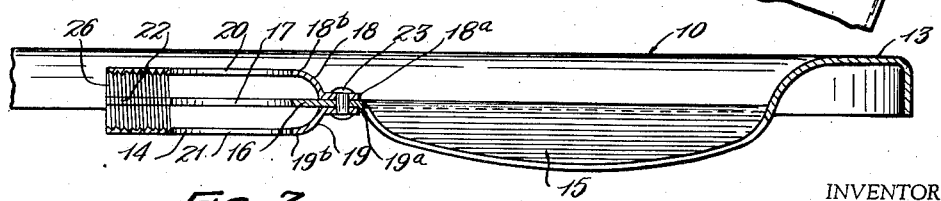
Fig. 3 is a partial sectional view taken through the structure as indicated by line 3—3 of Fig. 2.

The hub 14 comprises an intermediate disk portion 16 having a central shaft-receiving opening 17 and a pair of washers or disk members 18 and 19 secured against opposite sides of such intermediate disk portion and also having shaft-receiving openings 20 and 21 aligned substantially with the shaft-receiving opening 17. As shown in Figs. 2 and 3, the intermediate disk portion 16, the radial arms or spokes 15 and the rim portion 13 are all integrally connected and constitute portions of one and the same sheet metal body. By means of an appropriate stamping operation or operations, the rim 13, together with the arms or spokes 15, and the intermediate disk portion 16, can be formed from a suitable sheet metal blank and can be given the shape or form illustrated in the drawing.

As shown in Figs. 2 and 3, the intermediate disk portion 16 is substantially flat and has a radial slot 22 formed therein so as to extend from the shaft-receiving opening 20 to the periphery or outer edge of the disk. The disk members 18 and 19 have flat flange-like portions 18a and 19a adjacent their peripheries which are secured against opposite surfaces of the disk portion 16 in face-to-face contact therewith. Such flat portions of the disk members 18 and 19 may be connected with the disk portion 16 by spot welding, or preferably by the use of rivets 23 as shown in this instance. Inwardly of the flat portions just mentioned, the disk members 18 and 19 have oppositely dished portions 18b and 19b which are spaced from the disk portion 16 and give the hub an increased axial dimension or thickness.

The disk members 18 and 19 are also made as sheet metal stampings and have radially extending hollow ribs 18c and 19c formed thereon. These hollow ribs are so formed that when the disk members 18 and 19 are secured against opposite sides of the disk portion 16 their recesses will register substantially with the radial slot 22 and will cooperate with the latter to form a radial hole 25 which extends inwardly from the periphery of the hub and communicates with the shaft-receiving opening. By the use of a suitable tap or the like, a thread 26 may be cut or formed in the hole 25 to adapt the latter to receive a set screw 27 by which the hub and wheel structure may be locked to a shaft extending through the hub. In threading the hole 25 the thread 26 is cut into the concave inner surface of the hollow ribs 18c and 19c and is also cut in the edges of the slot 22 of the intermediate disk portion 16.

It will be seen from the accompanying drawing and the foregoing description that I have provided a simple and economical construction for use in hubs, wheels, spiders and the like, because the entire structure can be formed of sheet metal by the use of appropriate dies and stamping operations and the need for the machining of castings or other parts can be entirely avoided. It will be seen furthermore that when such hub and wheel structures are formed by the use of dies and sheet metal stamping operations, all of the parts will be produced with a desired uniformity and accuracy and when embodied in a centrifugal blower or other device, will contribute to the accuracy and balance thereof. In the case of a centrifugal blower, as shown in this instance, the circular rim portion 13 can be used as a jig or guide for facilitating the assembly operation and in obtaining a truly cylindrical arrangement for the blades 12.

While I have illustrated and described my hub and wheel structure in a more or less detailed manner, it will be understood, of course, that I do not wish to be limited to the particular construction and details herein illustrated and described, but regard my invention as including such changes and modifications as do not constitute a departure from the spirit of the invention and the scope of the appended claims.

Having thus described my invention, I claim:

1. A wheel-like structure for a fan or blower comprising a circular sheet metal member formed as a single piece and having a rim portion and a central disk portion connected with said rim portion by a plurality of bevelled arms, said central disk portion being substantially flat and having a shaft-receiving opening therein, and a pair of oppositely dished disks secured against opposite sides of said central disk portion and having openings aligned substantially with said shaft-receiving opening.

2. A wheel-like structure for a fan or blower comprising a circular sheet metal member formed as a single piece and having a rim portion and a central disk portion connected with said rim portion by a plurality of bevelled arms, said central disk portion being substantially flat and having therein a shaft-receiving opening and a radial slot extending from the periphery of such disk portion to its shaft-receiving opening, and a pair of oppositely dished sheet metal disks secured against opposite sides of said central disk portion and having openings aligned substantially with said shaft-receiving opening, said disks also having hollow ribs formed therein and lying on opposite sides of said slot so as to cooperate with the latter in forming a substantially radially extending hole communicating with said shaft-receiving opening.

3. A wheel-like structure for a fan or blower comprising a circular sheet metal member formed as a single piece and having a rim portion and a central disk portion connected with said rim portion by a plurality of bevelled arms, said central disk portion being substantially flat and having therein a shaft-receiving opening and a radial slot extending from the periphery of such disk portion to its shaft-receiving opening, a pair of oppositely dished sheet metal disks secured against opposite sides of said central disk portion and having openings aligned substantially with said shaft-receiving opening, said disks also having hollow ribs formed therein and lying on opposite sides of said slot so as to cooperate with the latter in forming a substantially radially extending hole communicating with said shaft-receiving opening, and a screw thread formed in the edges of said slot and the curved inner surfaces of said hollow ribs.

4. A hub for a blower or the like comprising a substantially flat disk portion having a central opening and a substantially radial slot extending from the periphery of such disk portion to said central opening, and a pair of disk members formed with hollow radially extending ribs thereon and secured against opposite sides of said disk portion with the slot of the latter disposed between and connecting the recesses of said hollow ribs.

5. A hub for a blower or the like comprising a substantially flat sheet metal disk portion having a central opening and a radial slot extending from the periphery of such disk portion to its central opening, and a pair of sheet metal disk members secured against opposite sides of said flat disk portion and having central shaft-receiving openings aligned with the opening of said disk portion, the portions of said disk members in which said openings are formed being spaced from said flat disk portion to increase the axial thickness of the hub and said disk members having hollow ribs whose recesses are coextensive with and connected by said slot to form a radial hole adapted to receive a locking member.

6. A hub for a blower or the like comprising a substantially flat disk portion having a central opening and a substantially radial slot extending from the periphery of such disk portion to said central opening, a pair of disk members formed with hollow radially extending ribs thereon and secured against opposite sides of said disk portion with the slot of the latter disposed between and connecting the recesses of said hollow ribs, and a screw thread formed in the edges of said slot and the curved inner surfaces of said hollow ribs.

7. A hub for a blower or the like comprising a substantially flat metal disk portion having a central opening and a radial slot extending from the periphery of the disk portion to said central opening, a pair of dished sheet metal disk members secured against opposite sides of said disk portion and having central openings aligned substantially with the central opening of the latter, said disk members having complemental holow radial ribs with their recesses substantially in register with said radial slot, and a screw thread formed in the edges of said slot and the curved inner surfaces of said hollow ribs.

FRANK G. MARBACH.